(12) United States Patent
Wang et al.

(10) Patent No.: US 8,037,060 B1
(45) Date of Patent: Oct. 11, 2011

(54) SYSTEM AND METHOD FOR DISPLAYING COLUMNS OF SEARCH RESULTS

(75) Inventors: Jiong Wang, Union City, CA (US);
Jonathan A. Gold, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 147 days.

(21) Appl. No.: 11/540,738

(22) Filed: Sep. 29, 2006

(51) Int. Cl.
*G60F 17/30* (2006.01)
(52) U.S. Cl. ...................................... 707/722
(58) Field of Classification Search ................ 707/3, 10, 707/706, 707, 767, 752, 722
See application file for complete search history.

(56) References Cited

U.S. PATENT DOCUMENTS

| | | | | |
|---|---|---|---|---|
| 5,715,402 A * | 2/1998 | Popolo | ........................... | 705/37 |
| 6,385,602 B1 * | 5/2002 | Tso et al. | ........................... | 707/3 |
| 6,826,572 B2 * | 11/2004 | Colace et al. | ................... | 707/10 |
| 6,961,731 B2 * | 11/2005 | Holbrook | ...................... | 707/102 |
| 7,161,906 B2 * | 1/2007 | Dell et al. | ..................... | 370/231 |
| 2005/0033803 A1 | 2/2005 | Vleet et al. | | |
| 2005/0165744 A1 * | 7/2005 | Taylor et al. | ....................... | 707/3 |
| 2005/0289120 A9 * | 12/2005 | Soulanille et al. | ................ | 707/3 |
| 2007/0038602 A1 * | 2/2007 | Weyand et al. | ................... | 707/3 |
| 2007/0070066 A1 * | 3/2007 | Bakhash | ...................... | 345/419 |

* cited by examiner

*Primary Examiner* — Charles Kim
*Assistant Examiner* — Fatima Mina
(74) *Attorney, Agent, or Firm* — Kilpatrick Townsend & Stockton

(57) ABSTRACT

A method for generating search results based on a search term and displaying the search results in one or more groupings. The method includes receiving a search term entered by a user, selecting one or more search result groupings based on the search term entered by the user and at least in part on a bid amount associated with the search term, providing search results based on the search term entered by the user for each search result grouping, and displaying the search groupings to the user.

38 Claims, 6 Drawing Sheets

SYSTEM AND METHOD FOR DISPLAYING COLUMNS OF SEARCH RESULTS

BACKGROUND

There are currently a wide variety of search engines and search tools that permit computer users to search for electronic information. Some search engines allow users to search general network-stored content. These and other search engines allow users to search narrower and/or other categories of information as well. For example, a search engine may allow users to search such categories as images, news, products for sale, etc. The search engine my further allow the user to search a category of the network-stored content organized by topic (e.g., art, business, computers, science, shopping, sports, etc.) or by various subcategories of content.

Different categories of search results and/or different topics of search results may be displayed to the user. One example may include a user interface having a plurality of search result groupings, such as columns, where each search result grouping is associated with a unique category and/or topic. The presentation of the categories in the user interface may be configured according to a wide variety of criteria, such as likelihood of applicability to a search term, previously selected categories of interest, etc. The configuration of columns may affect the likelihood that a user will select a link within any particular column.

Search engines generally allow sponsors to prominently display their links on search engine user interfaces using sponsored links. Sponsored links are search results that are provided based on the search results when users input search terms to a search engine. For example, if a visitor to the search engine enters the term "flowers," search results that a sponsor believes may be relevant to someone searching for flowers are displayed. Sponsors generally pay the provider of the search engine a fee for the display of the search results. The search results appear as a result of sponsors bidding on particular search terms, such as "flowers."

The bidding process is commonly managed by an intermediary, such as the search engine provider. Sponsors bid on search terms and submit search results associated with the search terms to the intermediary. The intermediary typically utilizes one or more engines for associating the search results with bids and search terms, keeping track of the highest bidders, scheduling, etc., and ensuring that at any given instance the search results corresponding to the highest bids are displayed when search terms matching the search terms are entered by the users of the search engine. Whenever a visitor clicks on a displayed search result, referred to herein as a "click event," the intermediary charges the sponsor a fee. The intermediary also commonly monitors the "click-through" rate (e.g., how many users actually select or click on the displayed advertisement). In some cases, if the number of users clicking on the sponsored search result is too low, the sponsored search result will no longer be displayed, even if it is associated with the highest bid.

An ongoing challenge is to ensure that sponsors receive adequate value for the money they spend on sponsorship. It would be beneficial to sponsors to be able to focus their advertising spending to capture the value of a prominently displayed search result grouping. It should be understood that, although certain advantages are described, the teachings herein may be used to implement systems and methods that do not have any of these advantages but which have other advantages.

SUMMARY

According to an exemplary embodiment, a method for generating search results based on a search term and displaying the search results in one or more groupings is shown. The method includes receiving a search term entered by a user, selecting one or more search result groupings based on the search term entered by the user and at least in part on a bid amount associated with the search term, providing search results based on the search term entered by the user for each search result grouping, and displaying the search groupings to the user.

This summary and the following detailed description are directed to certain specific embodiments of the invention. The invention is not limited to the particular embodiments and applications described herein. The invention is defined only by the claims.

DETAILED DESCRIPTION

The present application provides a search results display system 100 that displays groupings of search results to a user, such as the columns shown in FIG. 2 and described in further detail below. The system is configured to display search results associated with a search term entered by the user in one or more groupings. The search results may be grouped by category, provider, topic, result type, etc. The system is configured to display the groupings of search results in accordance with bids received from search grouping sponsors. The search grouping sponsors may be search grouping providers, advertisers, search result providers, retailers, etc.

In one embodiment, a search grouping sponsor may desire to secure a premium location or manner of display on a user interface within which that sponsor's grouping of search results will be displayed. A prominently displayed grouping of search results may be more likely to be clicked upon by a user compared to a search grouping that is less prominently displayed. Because of the premium involved, a sponsor submits a bid using bidding functionality associated with search results display system 100 to secure the location, described in further detail below with reference to FIGS. 4A and 4B.

Figure 1:
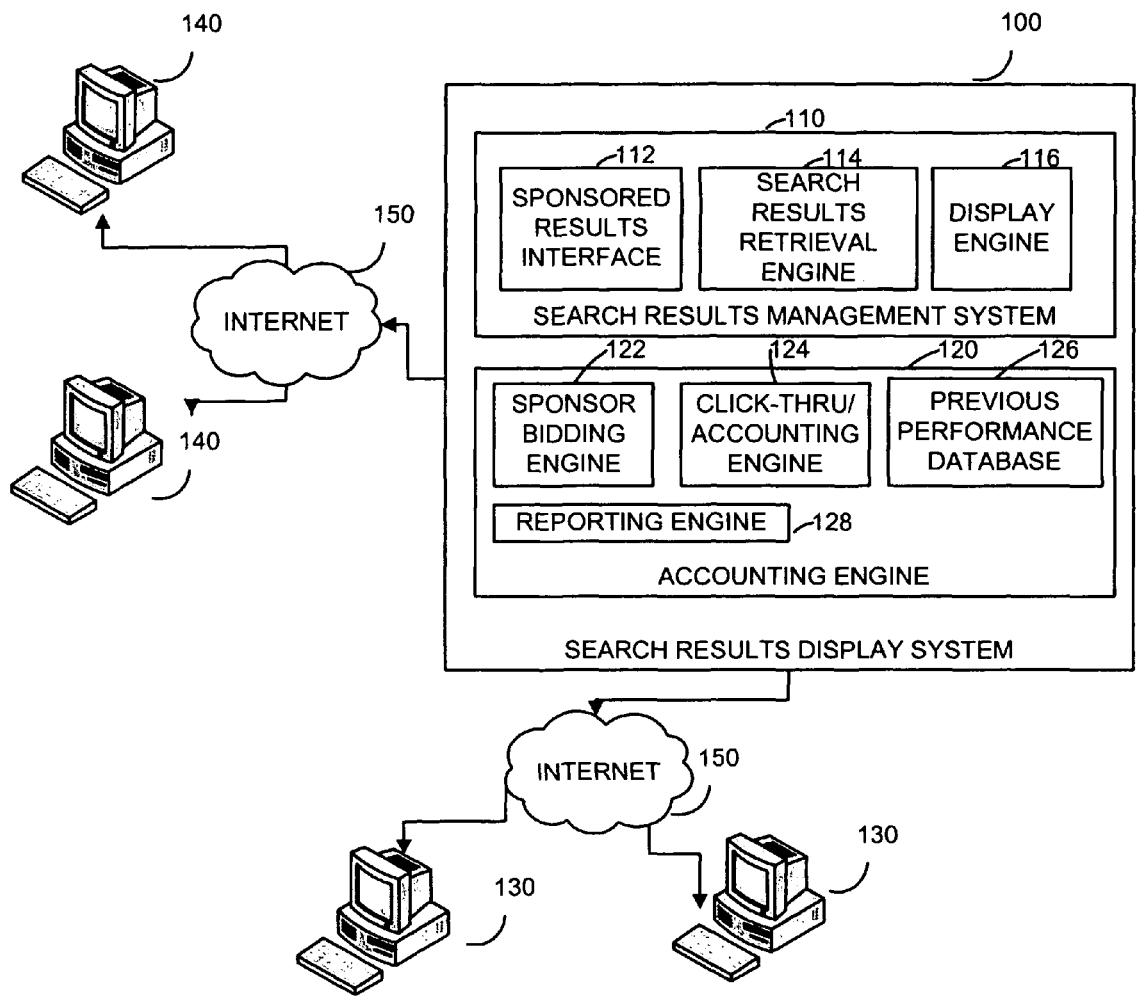
FIG. 1 is a search results display system, and associated components, used to implement a search results display and associated methods, according to one illustrative embodiment.

Referring now to FIG. 1, a search results display system 100, and associated components, used to implement the search results display and associated methods is shown, according to an exemplary embodiment. Search results display system 100 includes a search results management system 110 configured to receive, generate, and display one or more groupings of search results to one or more users 130 and an accounting engine 120 configured to receive bids from one or more sponsors 140. Although a particular configuration of systems, interfaces, and engines is shown according to an exemplary embodiment, it should be understood that system 100 may be configured to include more, fewer, and/or a different configuration of components to perform the function described herein.

Search results display system 100 may be implemented using separate computing systems (e.g., separate servers) or may be implemented as processes on a single computing system. Further, each engine or interface may alternatively be implemented using multiple, distributed systems.

Search results management system 110 includes a sponsored results interface 112, a search results retrieval engine 114, and a display engine 116. Search results management system 110 is configured to receive one or more groupings of search results from one or more sponsors 140 over a network 150, such as the Internet, generate additional groupings of search results as needed, and display one or more groupings of search results to one or more users 130.

Sponsored results interface 112 may be any type of computer system or application configured to interface with a computer system associated with a sponsor 140 to receive one or more sponsored groupings of search results to be displayed to one or more users 130. A sponsored grouping of search results may be received based on a successful bid made by the sponsor 140 providing the sponsored grouping of search results. The grouping of search results may be associated with a particular search term for which the sponsor provided the bid. The sponsored grouping of search results may be received each time the search term is entered by a user 130 to provide for update search results or may be an archived grouping stored by system 100 or any other system. In contrast, a sponsored link is link to single instance of a search result and not a grouping of search results.

Search results retrieval engine 114 may be configured to generate or receive one or more groupings of search results based upon one or more search terms entered by a user 130. The search term may be provided by user 130 in an input field of a user interface provided by display engine 116. Each grouping of search results is a collection of search results that are associated with a particular category, topic, file type, source, or any other common element or feature. The grouping may be generated by system 100, a sponsor system, or any other source.

Display engine 116 provides a user interface for displaying groupings of search results and a user interface configured to receive one or more search terms from a user 130. The user interface may be implemented as a set of web page templates and associated code modules.

Search results accounting system 120 includes a sponsor bidding engine 122, click-thru/accounting engine 124, a previous performance database 126, and a reporting engine 128. Search results accounting engine 110 is configured to provide a bidding interface and implement a bidding method allowing sponsors 140 to submit bids to system 100 for displaying their sponsored grouping of search results in a particular manner on the user interface provided by display engine 116. Search results accounting engine 110 is further configured to track the activity of users 130 in clicking on the sponsored groupings of search results, maintain and provide performance information related to the display of the sponsored grouping of search results, and to generate reporting information to be provided to sponsors 140.

Sponsor bidding engine 122 is configured to implement code and provide an interface configured to allow one or more sponsors to submit bids for placement their sponsored grouping of search results within a user interface implemented by display engine 116. Sponsors may submit bids to have their sponsored grouping of search results placed according to any manner of different configurations, such as, visible grouping of search results, obscured groupings of search results, accessible groupings of search results, etc. Placement can include a relative location on a user interface, a display method to be used when providing the grouping, and/or any other aspect of how the grouping is presented to a user. The groupings of search results and their relative placement within the user interface are shown and described herein in more detail below with reference to FIGS. 2 and 3.

Click-thru/accounting engine 124 may be a computer system or software configured for processing events related to the display of groupings of search results, and for recording resulting charges in the previous performance/accounting database 126. Exemplary events may include, but are not limited to, display of a sponsored grouping of search results, display of a sponsored grouping of search results in a particular placement, selection of a search results within a sponsored grouping of search results, etc. Accounting engine 124 may further be configured to adjust an amounted owed by a sponsor based on one or more of the events, as described in further detail below with reference to FIG. 5.

Previous performance/accounting database 126 is any type of database configured to receive and store information related to the operation of system 100. Exemplary information may include, but is not limited to, submitted bids, bids associated with particular search terms, display history for sponsored groups of search results, events associated with sponsored groups of search results, etc. The data used by the reporting interface 128, described below, may be maintained in a performance/accounting database 126. This information may be obtained based on purchases made from web publishers, advertisers, public information, gathered information, etc.

The reporting interface 128 provides functionality for reporting the results of sponsorship of a grouping of search results. Sponsors may access this interface 128 to evaluate the respective sponsorship. For example, reporting interface 128 may be configured to display the number of users 130 that clicked on the sponsor's grouping of search results that actually made a purchase or opened the sponsor's web page. The current purchase and/or access information for users 130 that clicked on a sponsor's grouping of search results may be displayed to illustrate advantages associated with sponsoring groupings of search results. For example, such information may be used to perform a cost-benefit analysis of submitting higher bids for displaying the sponsored grouping of search results in a particular placement, as described below. Advantageously, reporting interface 128 may be used to illustrate the benefit derived by the sponsors of groupings of search results.

Figure 2:
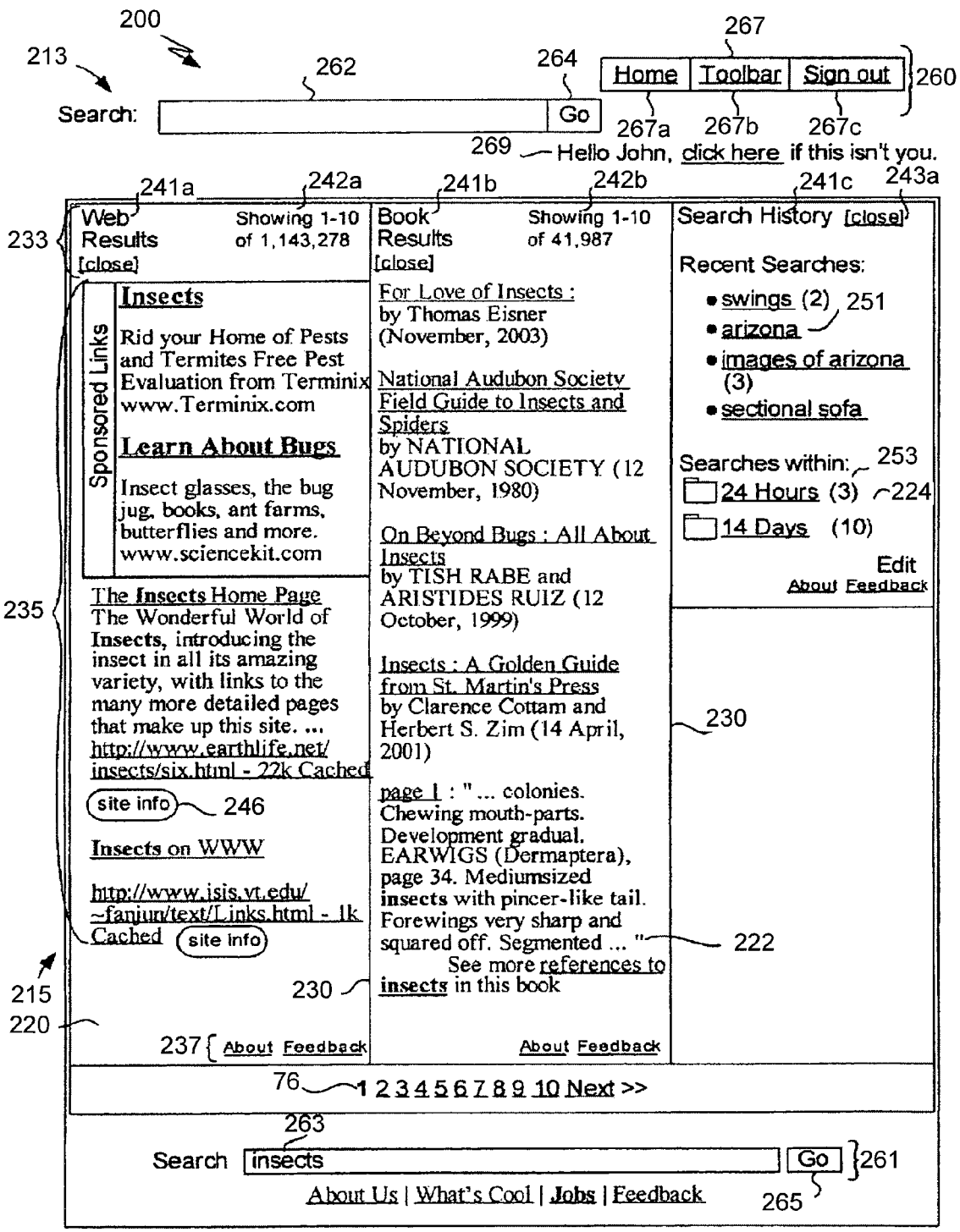
FIG. 2 is a representative user interface, according to an illustrative embodiment.

Referring now to FIG. 2, a representative user interface 200 is shown, according to an exemplary embodiment. The user interface 200 is represented as a browser window 213 that includes a search results window 215 having a plurality of separate panes. A pane maybe be any divided portion of space for user interface. In the illustrated embodiment three panes 220, 222 and 224 are provided that are visually divided into three adjacent columns. The panes are arranged to display different types of search results and/or search related information. Adjacent panes are separated by column markers 230. As will be explained in more detail below, the column markers 230 are arranged so that the relative widths of the columns may be adjusted by dragging the column markers back and forth.

Each pane includes a header region 233, a body region 235 and a footer region 237. In the illustrated embodiment, each of the headers includes a title field 241 and a close button 243. The title field displays a simple title that identifies the type of search results or search related information. For example, the title in title field 241(a) for pane 220 reads "Web Results" which indicates that the contents displayed in the body of pane 220 are the search results from a general web search. By way of example, the web search results may be the results of a general web search provided by a third party search engine or any similar general web based search engine. Title field 241(b) reads "Book Results" which indicates that the contents displayed in the body of pane 222 are the search results from a search of the contents of books. In the illustrated embodiment, the book search results are the results of a book text database provided by an online bookseller, although of course, the search could be of any suitable database. Title field 241(c) reads "Search History" which indicates that the contents displayed in the body of pane 224 is information indicative of searches that were previously conducted by the current user. It should be appreciated that the searches in the different categories may be conducted by the same search engine or by different search services.

The header regions also each have a "close" button or link 243, which will close the associated pane when selected. By way of example, if the close button 243(c) is selected in the environment illustrated in FIG. 2, it would cause the window 215 to refresh with the pane 224 closed. If the close button 243(b) associated with pane 222 is thereafter selected, it would also close the pane 222 and refresh window 215 with both panes 222 and 224 closed.

The headers 233 may also include other information that is believed to be useful to the user 130. By way of example, the headers 233(a) and 233(b) associated with the search results columns 220, 222 may include an indication 242(a), 242(b) of the number of search results found together with an indication of the results currently being shown in the associated pane.

The search results may be presented in any manner or form that is desired or deemed suitable by the search provider. In the illustrated embodiment, the body region 235 of the search result panes (columns) 220, 222 include a results list. Each entry in the web search results displayed in column 220 contains a link to the associated web page and typically includes a very short excerpt from the associated page (or page metadata). If a user selects a search result link, the browser is directed to retrieve and display the associated web page using standard browsing techniques. In a different embodiment (not illustrated) the body region 235 of one of the search result panes (columns) 220, 222 includes a scaled down or "preview" version of the web pages that is associated with the web search results. The preview version of the web pages can be displayed in the same pane as the links, similar to how the short excerpts from the associated pages are displayed in the embodiment illustrated in FIG. 2. Alternatively, the preview versions of the web pages can be displayed in a pane that is adjacent to the search result pane 220, 222, for example, as a result of a user moving his computer mouse across a web results listing link. In one embodiment, the user 130 can select the displayed preview version of a web page and thereby cause the browser to be directed to retrieve and display the actual web page using standard browsing techniques.

Each entry in the web search results may also include other information believed to be of interest to the user 130. For example, some of the illustrated listings include a "site info" button 246 that contains a link that provides information about the referenced website. In one implementation, the site info button causes a website information search to be performed on the associated web site.

When desired, the results within a column may be divided into sponsored results and un-sponsored results as illustrated in column 220. Typically, sponsored results are search results that an entity paid to have presented in response to the use of certain search terms. Of course the ordering of the search results, the presence or absence of sponsored search results and the general content of each listed entry may be widely varied.

In the illustrated embodiment, each listing in the book search results displayed in column 222 includes an indication of the book title, author, publication date, and potentially a very brief excerpt from the book. The book titles may contain an embedded link to a commercial bookseller's web page that is associated with the book (e.g. a page from which a user may purchase the book). If the user selects a book link, the browser is directed to retrieve and display the selected book related page.

The body section 235(c) of the search history pane 224 contains a listing of the users recent search history. The manner of presenting the search history may be widely varied. Some ways of gathering and presenting search history information are described in U.S. patent application Ser. No. 10/612,395, filed on Jul. 2, 2003, and entitled "Server Architecture and Methods for Persistently Storing and Serving Event Data," which is hereby incorporated herein by reference in its entirety. In the embodiment illustrated in FIG. 2, the search history information is presented in terms of a listing of a few of the most recent searches that were conducted followed by the presentation of a set of folders that contain listings of the searches that were conducted by the user in specific time periods. By way of example, the illustrated embodiments lists the four most recently executed searches and an indication of how many times those searches were run if they were recently run multiple times. Each of the search history entries 251 is arranged as a link. Selection of a recent search history entry 251 causes that search to be re-executed or updated or if the search results have been cached (or otherwise stored), they may simply be redisplayed. The re-executed (or redisplayed) search results would then be presented using the multi-paned search results window 215 described herein.

The search history folders 253 are also arranged as links. Each folder has an associated time period such as the last 24 hours, the last week, the last 14 days, the last month, etc. These folders each contain a list of search history entries corresponding to the searches that were conducted in the corresponding time period. Selection of a search history folder causes a list of search history entries corresponding to searches that were performed during the corresponding time period to be displayed within pane 224, while maintaining the contents of the other displayed panes (e.g., 220 and 222).

In addition to the multi-paned search results window 215, the user interface associated with web page 213 may also include some page header information 260 and some page footer information 261. In the illustrated embodiment, both the page header and the page footer include a search dialog box 262, 263, which permits users to enter search terms for a new search and a "go" button 264, 265 which causes the execution of a search entered into its associated search dialog box 262, 263. The execution of a new search typically causes the contents of the entire multi-paned search results window 215 to be updated to display the new search results.

The page header 260 and page footer 261 may also contain any other information believed to be useful and desirable. For example, in the illustrated embodiment, the page header 260 also includes a string of buttons 267. The first button 267(*a*) provides a link to the home page of the web site hosting the described search results GUI. The second button 267(*b*) provides a link to a toolbar that can be used to provide additional functionality. The third button 267(*c*) allows a user to sign out. The illustrated page header also includes a greeting 269 that welcomes the user and provides a link to a sign-in page in the event that the wrong user has been identified. It should be appreciated that signing in or otherwise recognizing the user is useful in embodiments that track the search history so that the search history accurately reflects the current user's search history.

Figure 3:
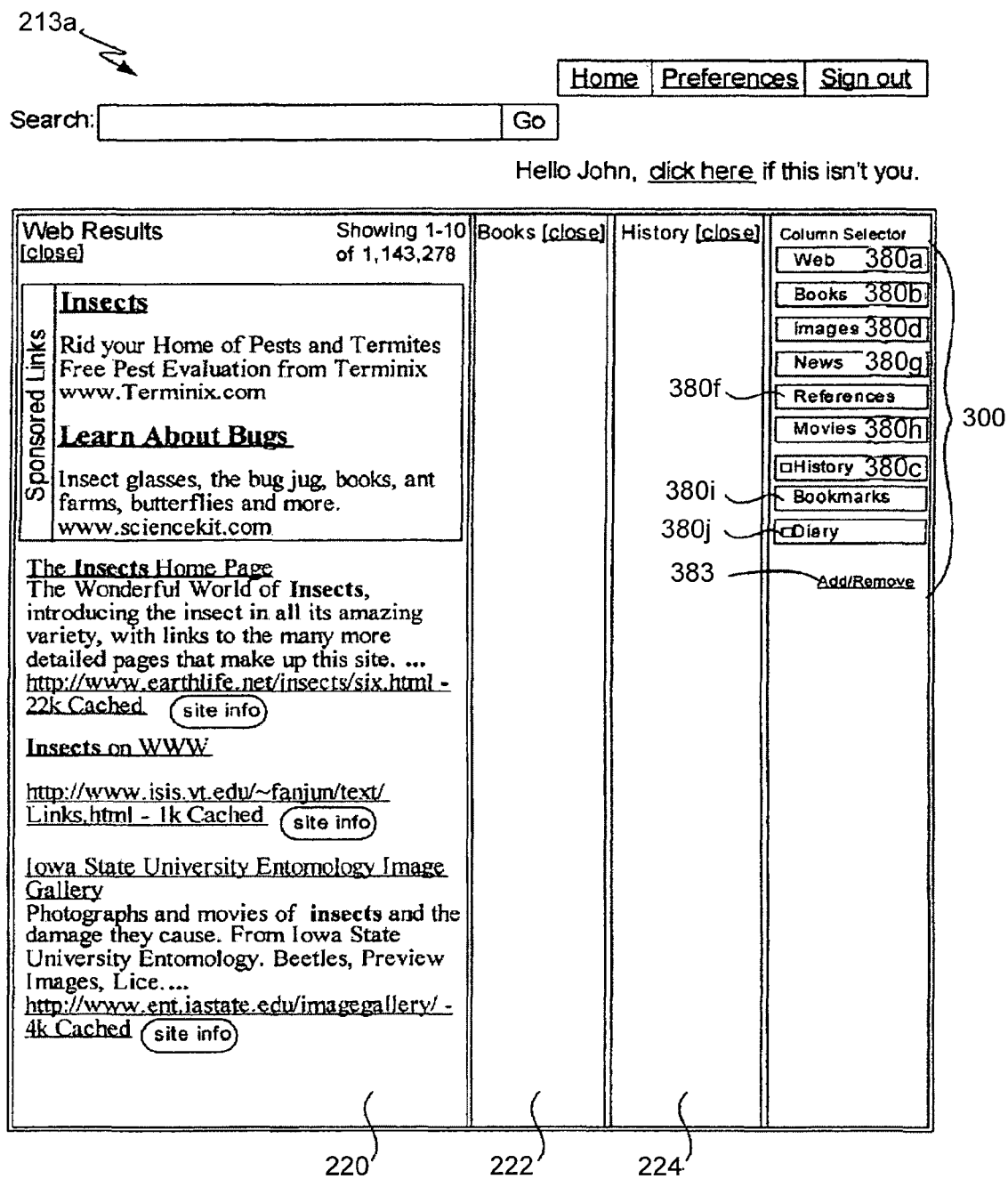
FIG. 3 is another embodiment of a user interface, according to another illustrative embodiment.

Referring next to FIG. 3, another embodiment of a user interface is shown, according to an exemplary embodiment. In this embodiment, the panes and the surrounding features (e.g., search dialog box 262, etc.) may be generally configured the same manner as in the previously described embodiment. However, a column selector 300 is also provided that in the illustrated embodiment, is displayed along the right hand side of the search results window adjacent the visible panes. Of course, in other embodiments, the location of the column selector 300 may be varied, and it may be placed, for example, in the header or footer portion of search results page 213(*a*), along the left side of the page or at any other suitable location. In the state illustrated in FIG. 3, the search results page 213(*a*) has three visible columns 220, 222 and 224, which correspond to the web results, book results and search history categories previously described. The illustrated column selector 300 has a set of nine vertically separated buttons 380 that correspond to the available categories. In the illustrated embodiment, the buttons (which correspond to the available categories) include web results button 380(*a*), book results button 380(*b*), images results button 380(*d*), news button 380(*g*), reference button 380(*f*), movie button 380(*h*), history button 380(*c*), bookmark button 380(I) and diary button 380 (*j*).

The illustrated column selector 300 also includes an add/remove link 383 that links to a column selector preferences dialog box (not shown) that permits users to configure their column selector 300. The preferences button 267(*d*) may also be used to provide users access to either the same or a different preferences dialog interface. By way of example, the user may be given control over the buttons that are presented, the display location of the column selector, display colors, pane sizing and configuration constraints, the maximum number of visible panes, pane resizing rules in response to the opening and closing of new panes, etc.

A closed pane may be opened by selecting its associated button 380 in the column selector 300 and optionally, an visible pane can be closed by selecting the same button. In the illustrated embodiment, the column selector is provided in addition to any close or open buttons/links 243, 270 etc. that may be provided in a displayed column as described in the previous embodiments. As discussed above, when a closed pane is opened, the other visible panes are typically resized, but remain visible. It should be appreciated that if too many panes are visible at a particular time, then some of the columns will become too narrow to be able to present useful information. Therefore, the system may be arranged so that when a new pane is opened and there are too many visible columns, then one or more of the existing visible columns may be automatically closed. There are a wide variety of rules that could be applied to dictate when a pane should be automatically closed without user input and what particular pane to close. Preferably, the user would be given at least some control over the rules applied by accessing the preferences dialog box.

By way of example, one automatic closing rule could be to provide a designated maximum number of panes (e.g. 5 columns) that may be open at one time. Using this approach, there also has to be a rule designating which of the currently visible columns to close when a new pane is opened. One suitable rule would be to close the pane that had not been clicked in or otherwise browsed for the longest period of time. Another suitable rule would be to close the smallest visible pane.

A different automatic closing rule would be to close each pane that falls below a designated minimum display width. By way of example, threshold widths on the order of 10-20 percent of the available columns display space width may work well for this approach. In this approach, when a new pane is opened, the existing panes may be resized as described above. However if any of the panes would be reduced in width below the designated minimum display width, those panes would be closed and the others resized appropriately. Alternatively, one of the narrowest of the panes could be closed and the other sizes recalculated. If any of the remaining panes are still narrower than the designated minimum display width, the then narrowest pane would also be closed and the remaining panes resized in accordance with the appropriate resizing rules. Of course, a wide variety of other resizing rules could be used as well.

Figure 4A:
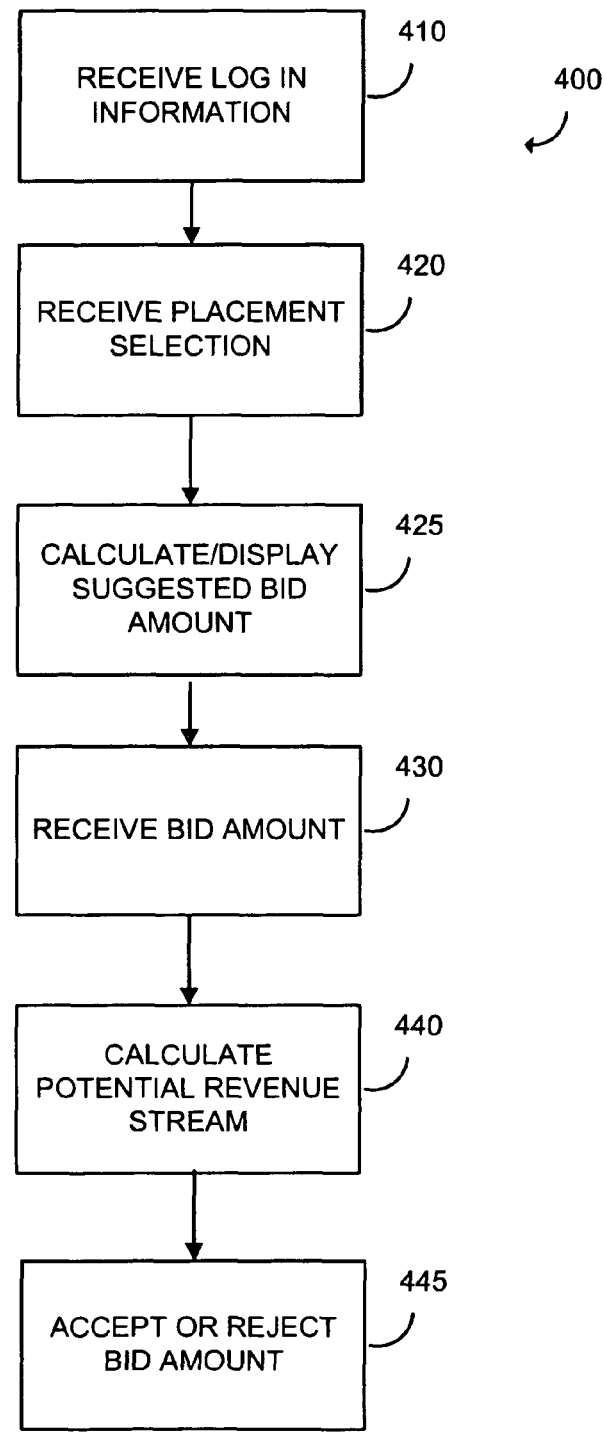
FIG. 4A is a flowchart illustrating a method of providing a grouping of search results based on a sponsor bid that was submitted by the sponsor, according to an illustrative embodiment.

Referring now to FIG. 4A, a flowchart 400 illustrating a method for receiving bids for placement of a sponsored grouping of search results within a interface is shown, according to an exemplary embodiment. Although a particular order of steps are shown in a particular order, the method may include more, fewer, and/or a different ordering of steps.

In a step 410, system 100 may receive log in information through a bidding interface from a sponsor to initiate the bidding process. The received log in information may be used to access database 126 to access information regarding the potential sponsor including a past history of bids and submitted groupings of search results, a credit history for the sponsor, a performance history (such a number of click thrus generated, the time spent on a web page selected from previous groupings, the results of a client satisfaction survey, previously received rating and/or complaints, etc.) for grouping of search results provided by the sponsor, etc.

In a step 420, system 100 may be configured to utilize the bidding interface to present and receive a selection from a listing of placements within the user interface displaying the grouping of search results. Sponsor 140 may select a placement where they would like to bid to have their grouping of search results placed. Exemplary placements may include visible search results groupings, such as panes 220, 222, and 224, obscured search result groupings, such a buttons 380 *a-j*, and accessible search results groupings, such as groupings that will be displayed upon selection of the add/remove link 383. Placement may also include the ordering or placement within a listing, a relative positioning of the grouping on the user interface, etc. Placement options may be displayed to a sponsor as a obscured list, within a drop down menu, etc.

In a step 425, system 100 may be configured to generate a suggested bid amount based on the placement selected by the sponsor. The suggested bid amount may be determined based on previously received bids for that placement, attributes of the sponsor, etc. The suggested bid may be displayed on the bidding interface prior to receipt of a bid from a sponsor.

In a step 430, system 100 may be configured to receive a bid from a sponsor. The bid may be received in an input field of a bidding interface. The bid may be an amount charged for each time the grouping of search results is displayed, a monthly fee, an amount to be charged each time a search result from the grouping of search results is selected, or any other type of payment.

In a step 440, system 100 may be configured to generate a projected revenue stream based on the received bid amount, characteristics of the bid amount, characteristics of a grouping of search results, etc. The projected revenue stream may further include a confidence value based on the quality and quantity of information used to generate the projected revenue stream.

In a step 445, system 100 may be configured to accept or reject the bid. Acceptance and/or rejection may be based on the amount of the bid submitted, the amount of bids received from other sponsors, the projected revenue stream, projected revenue streams for bids from other sponsors, the particular search term being bid upon, etc.

Figure 4B:
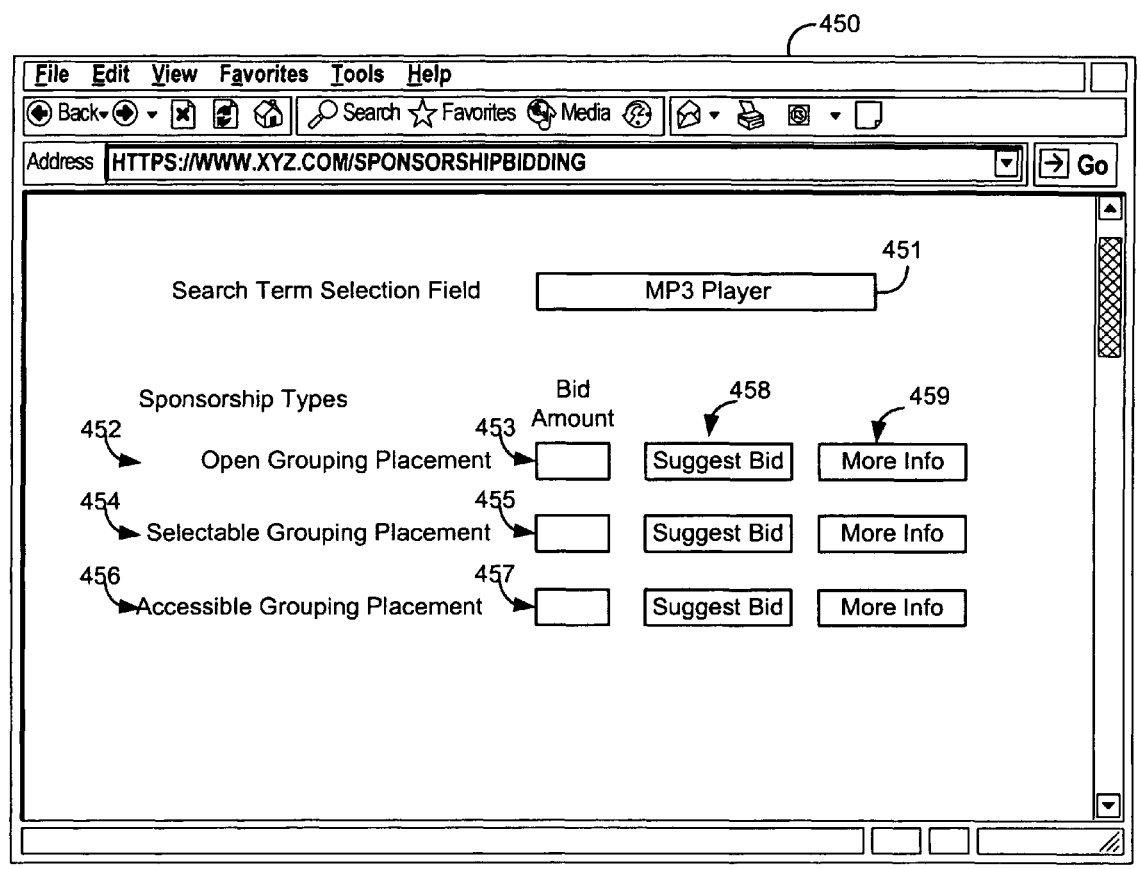
FIG. 4B is an illustration of a web-based bidding interface that allows a sponsor to place different bids for different placements of a grouping of search results, according to an illustrative embodiment.

Referring now to FIG. 4B, an illustration of a web-based bidding interface 450 that allows a sponsor to place different bids for different placements of a grouping of search results is shown, according to an exemplary embodiment. Interface 450 includes a search term selection input field 451 configured to allow the sponsor to provide a search term or search term category upon which to place a bid. The user may submit a plurality of bids for that search term from a predetermined listing of placements within a user interface for display groupings of search results. For example, a user interface includes visible groupings of search results, obscured groupings of search results, and accessible groupings of search results. For example, where a sponsor has selected a search term of "MP3 players", as shown in FIG. 4B, interface 450 includes a visible grouping placement listing 452 which includes a field 453 to enter a bid for that particular placement, a obscured groupings parameter listing 454 which includes a field 455 to enter a bid for that particular placement, and a accessible grouping parameter listing 456 which includes a field 457 to enter a bid for that particular listing.

System 100 may further be configured to analyze the received search term to apply the sponsors bid to related search terms and/or search term categories. For example, where a sponsor has selected a search term of "iPod", as shown in FIG. 4B, system 100 may be configured to apply the users bid to a search term category of "MP3 Players."

Each of the parameter listings 452-460 may be configured to allow advertisers to make their bids based on a parameter that is associated with a placement that is particularly valuable to an sponsor or in line with their desired spending. For example, an visible search grouping placement is more likely to result in selection of a search result from the sponsor's grouping of search results. Accordingly, an advertiser may bid a larger amount for an visible grouping. Advantageously, submitting bids based on the parameter of interest allows a sponsor to implement more targeted advertising. Providing multiple input fields allows the sponsor to enter multiple bid amounts, according to the differing value a sponsor associates with each parameter listing.

Although exemplary parameter listings are shown and described above with reference to interface 450, it should be understood that other parameter listings may be provided which include fields for bidding on other types of parameters. The parameters may include different parameter listing types, different amounts associated with each parameter listing, etc. Exemplary additional parameters may relate to an ordering within each type of placement, highlighting features added to the grouping, etc.

Bidding interface 450 may further include a "suggested bid" button in a column 458 that will automatically populate input fields associated with the various placements. A suggested bid may be calculated based on a combination of the search term, the placement and historical data indicating the amount of bids that have previously been required for a given placement. Alternatively, a suggested bid may be displayed automatically upon access of bidding interface 450. According to further alternative embodiments, the suggested bid button in column 458 may be replaced with a data field which conveys to the sponsor the premium value of a particular placement. For example, column 458 may include a value indicating a premium that a sponsor should expect to pay for a particular placement.

Bidding interface 450 may further be configured to include a "detailed information" button for each placement in a column 459. Each detailed information button, when clicked, may cause a pop-up window to appear showing attributes, statistics, or other information associated with any particular placement. For example, a pop-up window may display the average number of click thrus associated with each particular placement.

Figure 5:
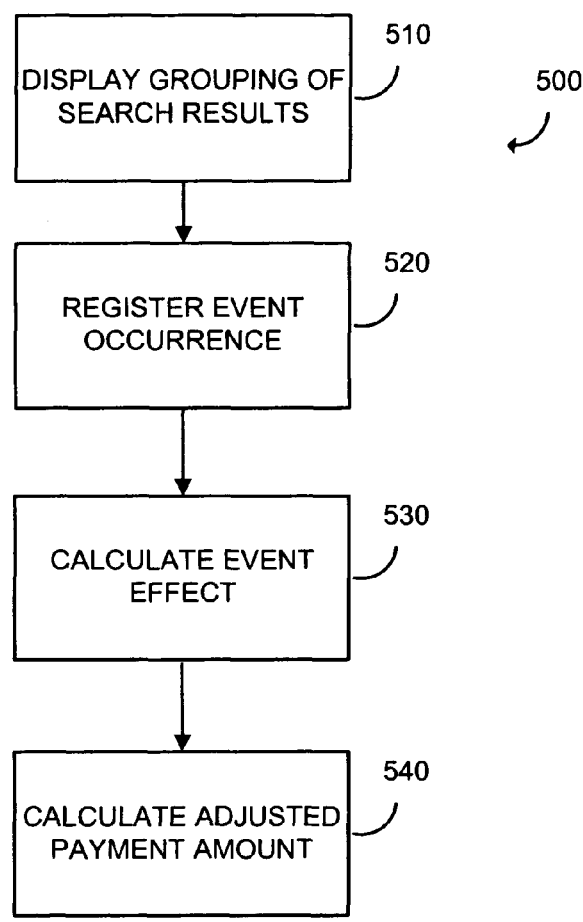
FIG. 5 is a flowchart illustrating a method of adjusting the amount paid by the sponsor of a sponsored grouping of search results based on a performance metric, according to an illustrative embodiment.

Referring now to FIG. 5, a flowchart 500 illustrating a method of adjusting the amount paid by the sponsor of a sponsored grouping of search results based on a performance metric is shown, according to an exemplary embodiment. The method may be implemented by system 100.

In a step 510, system 100 is configured to display the sponsored grouping of search results on a user interface. The sponsored grouping of search results may be displayed based upon entry by a user 130 of a particular search term that is associated with the sponsored grouping of search results.

Following display of the sponsored grouping of search results, system 100 may be configured to detect and record the occurrence of one or more events associated with the sponsored grouping of search results in a step 520. Events may include selection of a search result by a user, purchase of a product listed in the sponsored grouping of search results by a user, navigation within the sponsored grouping of search results, etc.

Following an event, system 100 may be configured to determine whether the amount to be paid by the sponsor should be adjusted based on the event. The amount to be paid may be adjusted based on events that provide a benefit to the provider of system 100 as well as the sponsor. Exemplary benefits may include a large volume of click-thrus, increasing the amount collected from the sponsor and raising the prestige of the provider of system 100, etc.

In a step 550, an accounting may be provided to the sponsor indicating the amount owed based on the sponsorship. The amount owed may be adjusted based on the one or more events that occurred within the latest accounting cycle. The sponsorship fee that is payable by the sponsor is based in part on the sponsor's bid amount. The fee may be further based on any of a variety of factors, such as whether the user actually clicked on a search result within the grouping, whether a transaction occurred, etc.

Although the above described steps are described as being performed in a certain order by a single entity, it should be understood that the method may include more, less, and/or a different ordering of the steps and be performed by any number of entities.

Those skilled in the art will also appreciate that the sample screens discussed above may be structured in different manners, with information added or removed, with information displayed on more screens or fewer screens, and with the interaction between various screens implemented in different manners. The data structures supporting the screens may also be structured in a different manner and contain more or less information than depicted.

It should be noted that although flow charts may be provided herein to show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps, and decision steps. It should also be noted that the word "component" as used herein and in the claims is intended to encompass implementations using one or more lines of software code, and/or hardware implementations, and/or equipment for receiving manual inputs. It is to be understood that any method steps as recited herein (e.g., in the claims) may be performed by a configuration utility (e.g., Java™-based) executed by a computing device based on input by a user. Of course, according to various alternative embodiments, any suitable configuration utility, application, system, computing device, etc. may be used to execute, implement and/or perform method steps as recited in this disclosure (including the claims).

Although functions have been described herein as being performed by particular systems or sub-systems, it should be understood that any described function may alternatively be performed by any of system or sub-system of system 100. Further, functions described herein as being performed as being performed by system 100 may alternatively be performed by any external system coupled to system 100.

The invention is described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems, and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machine to perform a certain function or group of functions.

Embodiments of the invention have been described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components, including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules, and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented method for organizing a plurality of search results for display, comprising:
    under the control of one or more computer systems configured with executable instructions,
        receiving at least one bid amount for placement of a grouping of sponsored search results in a sponsored portion of a pane within a search result presentation comprising a plurality of panes adjacent to each other and a pane selector having a plurality of buttons that enable a user to select the plurality of panes for simultaneous presentation, the grouping of sponsored search results associated with a search term, each one of the plurality of panes configured to display search results related to a different search result type;
        obtaining one or more search result groupings based at least in part on a search term submitted by the user and the plurality of search result types, wherein each search result grouping is associated with at least one of the at least one bid amount for placement, a search result type and a plurality of search results that are based at least in part on the search term and the search result type;
        determining at least one featured search result grouping from the one or more search result groupings based at least in part on the at least one bid amount for placement respectively associated with each of the one or more search result groupings;
        for each of the at least one featured search result grouping, providing the plurality of search results of the featured search result group for display in the sponsored portion of the pane; and
        in response to a user selection of one of the plurality of buttons,
            opening a pane associated with the one of the plurality of buttons; and
            closing a pane that was not accessed for a longest period of time among all open panes when a number of the open panes exceeds a predetermined threshold.

2. The method of claim 1, wherein determining the at least one featured search result grouping includes determining based in part on a projected revenue stream determined by the bid amount.

3. The method of claim 2, determining the at least one featured search result grouping is further based at least in part on a previous performance metric associated with an entity that provided an associated bid amount for the at least one featured search result grouping.

4. The method of claim 3, wherein the previous performance metric includes at least one of a click thru rate, time spent on a sponsor's site, results of a satisfaction survey, and a confidence score.

5. The method of claim 1, further including generating an advertising fee based at least in part on providing the plurality of search results of the featured search result group for display.

6. The method of claim 5, wherein the advertising fee is based at least in part on the bid amount.

7. The method of claim 6, wherein the advertising fee is further based at least in part on a number of search results selected within the plurality of search results provided for display.

8. The method of claim 1, wherein the pane configured to display the search result type of the feature search result grouping is initially obscured.

9. The method of claim 1, further including receiving one or more bid amounts for the search result type from entities offering to provide search results for the search result type.

10. The method of claim 9, wherein at least one bid amount from the entities is associated with one of an obscured pane, and an accessible pane.

11. A computer-implemented data processing system for displaying a plurality of search results, comprising:
    a processing unit; and
    a storage device coupled to the processing unit and having information stored therein for configuring the processing unit to, at least:
        obtain one or more search result groupings based at least in part on a search term submitted by a user and a plurality of grouping types, wherein each search result grouping is associated with a bid amount for placing the grouping in a sponsored portion of one of a plurality of panes of a search result presentation that includes a pane selector having a plurality of buttons enabling the user to select the plurality of panes for simultaneous presentation, a grouping type selected from the plurality of grouping types and a plurality of search results that are based at least in part on the search term and the grouping type;
        determine at least one featured search result grouping from the one or more search result groupings based at least in part on the bid amount respectively associated with each of the one or more search result groupings;
        for each of the at least one featured search result grouping, provide the featured search result grouping for display in the sponsored portion of the one of the plurality of panes associated with the featured search result grouping so as to allow selection by the user of one of the plurality of search results associated with the featured search result grouping; and
        in response to a user selection of one of the plurality of buttons,
            open a pane associated with the one of the plurality of buttons; and
            close an open pane when a number of open panes exceeds an allowable threshold, the open pane to be closed being selected based at least in part upon a time of last access of the open pane.

12. The system of claim 11, wherein to determine at least one featured search result grouping from the one or more search result groupings includes determining based in part on a projected revenue stream determined by the bid amount.

13. The system of claim 12, wherein to determine at least one featured search result grouping from the one or more search result groupings is further based at least in part on a previous performance metric associated with an entity that provided the bid amount for the at least one featured search result grouping.

14. The method of claim 13, wherein the previous performance metric includes at least one of a click thru rate, time spent on a sponsor's site, results of a satisfaction survey, and a confidence score.

15. The system of claim 11, wherein the processing unit is further configured to generate an advertising fee based at least in part on providing for display of the selected one or more search result groupings.

16. The system of claim 15, wherein the advertising fee is based at least in part on the bid amount.

17. The system of claim 16, wherein the advertising fee is further based at least in part on the number of search results selected within the search result grouping associated with the bid amount.

18. The system of claim 11, wherein to provide for display of the at least one featured search result grouping includes displaying the at least one featured search result grouping as a selection that may be selected by a user.

19. The system of claim 11, wherein the processing unit is further configured to receive one or more bid amounts for the search term from entities offering to provide a search result grouping for the search term.

20. The system of claim 19, wherein at least one bid amount received by the processing unit is associated with one of an obscured search grouping and an accessible search grouping.

21. A computer-implemented method for displaying a grouping of search results, comprising:
   under the control of one or more computer systems configured with executable instructions,
   receiving a search term from a user;
   obtaining one or more search result groupings based at least in part on the search term and a plurality of grouping types, wherein each search result grouping is associated with a bid amount for placing the grouping in a sponsored portion of one of a plurality of panes of a search result presentation that includes a pane selector having a plurality of pane selection elements that enable the user to select the plurality of panes for simultaneous presentation, a grouping type selected from the plurality of grouping types and a plurality of search results that are based at least in part on the search term and the grouping type;
   receiving a bid amount for placement of at least one featured search result grouping to be determined from the one or more search result groupings;
   providing an acceptance or rejection of the bid amount for placement;
   for each of the at least one featured search result grouping, providing the featured search result grouping for display in the sponsored portion of the one of the plurality of panes associated with the bid amount of the featured search result grouping; and
   in response to a user selection of one of the plurality of pane selection elements,
      opening a pane associated with the one of the plurality of pane selection elements; and
      closing a pane that was not accessed for a longest period of time among all open panes when a number of the open panes exceeds a predetermined threshold.

22. The method of claim 21, further including applying the search term to select one or more additional search terms or search term categories.

23. The method of claim 21, wherein the acceptance or rejection is provided based in part on a projected revenue stream determined by the bid amount.

24. The method of claim 23, wherein the projected revenue stream is further determined based at least in part on a previous performance metric associated with an entity that provided the bid amount.

25. The method of claim 21, further including generating an advertising fee based at least in part on displaying the at least one featured search result grouping.

26. The method of claim 25, wherein the advertising fee is based at least in part on the bid amount.

27. The method of claim 26, wherein the advertising fee is further based at least in part on the number of search results selected within the featured search result grouping associated with the bid amount.

28. The method of claim 21, wherein receiving the bid amount for at least one featured search result grouping includes receiving a plurality of bid amounts for a plurality of different featured search result groupings.

29. The method of claim 28, wherein the at least one featured search result grouping includes at least two of: a visible search grouping, an obscured search grouping, and an accessible search grouping.

30. A computer-implemented data processing system for displaying a grouping of search results, comprising:
   a processing unit; and
   a storage device coupled to the processing unit and having information stored therein for configuring the processing unit to, at least:
      receive a search term from a user;
      obtain one or more search result groupings based at least in part on the search term and a plurality of grouping types, wherein each search result grouping is associated with a bid amount for placing the grouping in a sponsored portion of one of a plurality of panes of a search result presentation that includes a pane selector having a plurality of pane selection elements enabling the user to select the plurality of panes for simultaneous presentation, a grouping type selected from the plurality of grouping types and a plurality of search results that are based at least in part on the search term and the grouping type;
      receive a bid amount for placement of a featured search result grouping selected from the one or more search result groupings;
      provide an acceptance or rejection of the bid amount for placement;
      provide the featured search result grouping for display in the sponsored portion of the one of the plurality of panes associated with the bid amount of the featured search result grouping enabling user selection of one of the plurality of search results in the featured search result grouping; and
      in response to a user selection of one of the plurality of pane selection elements,
         open a pane associated with the one of the plurality of pane selection elements; and
         close a pane that was not accessed for a longest period of time among all open panes when a number of the open panes exceeds a predetermined threshold.

31. The system of claim 30, wherein the processing unit is further configured to utilize the search term to select one or more additional search terms or search term categories.

32. The system of claim 30, wherein the acceptance or rejection is provided based in part on a projected revenue stream determined by the bid amount.

33. The system of claim 32, wherein the projected revenue stream is further determined based at least in part on a previous performance metric associated with an entity that provided the bid amount.

34. The system of claim 30, wherein the processing unit is further configured to generate an advertising fee based at least in part on displaying the featured search result grouping.

35. The system of claim 34, wherein the advertising fee is based at least in part on the bid amount.

36. The method of claim 1, wherein said at least one bid amount for placement includes at least one bid amount for placement of the grouping of sponsored search results in the sponsored portion of an obscured pane that is available for selection by the user with the pane selector but is not currently selected.

37. The method of claim 1, wherein said at least one bid amount for placement includes at least one bid amount for placement of the grouping of sponsored search results in the sponsored portion of an accessible pane that is capable of being selected for addition to the pane selector but is not immediately available for selection by the user with the pane selector.

38. The method of claim 1, wherein said at least one bid amount for placement includes a plurality of types of bid corresponding to a plurality of types of placement controlled by the pane selector.

* * * * *